US006463811B1

(12) United States Patent
Putney

(10) Patent No.: US 6,463,811 B1
(45) Date of Patent: Oct. 15, 2002

(54) BENDING BEAM TORQUE WRENCH

(75) Inventor: Gordon A. Putney, Lake Geneva, WI (US)

(73) Assignee: Snap-on Tools Company, Kenosha, WI (US)

( * ) Notice: Subject to any disclaimer, the term of this patent is extended or adjusted under 35 U.S.C. 154(b) by 0 days.

(21) Appl. No.: 09/301,207

(22) Filed: Apr. 28, 1999

(51) Int. Cl.[7] .................................................. G01F 1/60
(52) U.S. Cl. .................................................. 73/862.21
(58) Field of Search ............................ 81/179, 77, 126, 81/127; 73/862.26, 862.21, 862.193, 862.325

(56) References Cited

U.S. PATENT DOCUMENTS

| | | | | | |
|---|---|---|---|---|---|
| 2,074,079 | A | | 3/1937 | Bahr et al. | |
| 2,122,760 | A | | 7/1938 | Scott et al. | |
| 2,201,234 | A | | 5/1940 | Kress | |
| 2,289,238 | A | | 7/1942 | Brunelle | |
| 2,303,411 | A | | 12/1942 | Van Horn | |
| 2,553,311 | A | | 5/1951 | Greer | |
| 2,996,940 | A | | 8/1961 | Van Hoose | |
| 3,596,543 | A | * | 8/1971 | Green | 81/52.4 |
| 3,670,602 | A | * | 6/1972 | Van Hoose | 81/52.4 |
| 3,726,135 | A | * | 4/1973 | Vuceta | 73/139 |
| 3,747,423 | A | | 7/1973 | Mitchell | |
| 3,892,150 | A | * | 7/1975 | Horton | 81/179 |
| 4,226,127 | A | * | 10/1980 | Hardiman | 73/761 |
| 4,257,263 | A | | 3/1981 | Herrgen | |
| 4,488,442 | A | | 12/1984 | Pacinelli | |
| 4,541,313 | A | | 9/1985 | Wise | |
| 4,558,601 | A | * | 12/1985 | Stasiek et al. | 73/862.23 |
| 4,562,746 | A | | 1/1986 | Petit | |
| 4,589,289 | A | | 5/1986 | Neuhaus | |
| 4,615,220 | A | | 10/1986 | Johansson | |
| 4,641,538 | A | * | 2/1987 | Heyraud | 73/862.26 |
| 4,643,030 | A | | 2/1987 | Becker et al. | |
| 4,669,319 | A | | 6/1987 | Heyraud | |
| 4,762,007 | A | | 8/1988 | Gasperi et al. | |
| 4,765,416 | A | | 8/1988 | Bjerking et al. | |
| 4,791,839 | A | | 12/1988 | Bickford et al. | |
| 4,854,764 | A | | 8/1989 | Faber et al. | |
| 4,954,004 | A | | 9/1990 | Faber et al. | |
| 4,982,612 | A | | 1/1991 | Rittmann | |
| 4,992,948 | A | | 2/1991 | Pilland et al. | |
| 5,181,575 | A | | 1/1993 | Maruyama et al. | |
| 5,230,262 | A | | 7/1993 | Ahlund et al. | |
| 5,303,601 | A | | 4/1994 | Schonberger et al. | |
| 5,400,663 | A | | 3/1995 | Bridges | |
| 5,435,190 | A | | 7/1995 | Jansson et al. | |
| 5,465,627 | A | | 11/1995 | Garshelis | |
| 5,476,014 | A | | 12/1995 | Lampe et al. | |
| 5,520,059 | A | | 5/1996 | Garshelis | |
| 5,533,409 | A | | 7/1996 | Crane et al. | |
| 5,537,877 | A | | 7/1996 | Hsu | |
| 5,589,644 | A | | 12/1996 | Becker et al. | |
| 5,651,667 | A | | 7/1997 | Sand et al. | |
| 6,070,506 | A | * | 6/2000 | Becker | 81/479 |
| 6,109,150 | A | * | 8/2000 | Saccomanno, III | 81/478 |

* cited by examiner

*Primary Examiner*—Benjamin R. Fuller
*Assistant Examiner*—Jewel V. Tompson
(74) *Attorney, Agent, or Firm*—Seyfarth Shaw

(57) ABSTRACT

A torque indicating wrench has a resilient beam with a handle end and a work-engaging end carrying a ratchet mechanism. The resilient beam is generally channel-shaped in transverse cross section and is tapered in thickness from the work-engaging end to the handle end. A reference beam is disposed in the channel and has first and second ends respectively pivotally coupled to the work-engaging and handle ends of the resilient beam. The reference beam has openings adjacent to its first and second ends to facilitate pivotal coupling to the resilient beam while substantially eliminating non-pivotal relative movement in use. A handle housing encloses the beams along substantially their entire lengths and is fixed to the resilient beam only adjacent to its handle end. The reference beam carries a Hall-effect sensor disposed between magnets on the resilient beam and coupled to electronic indicating circuitry including a display viewable through a window in the housing and push-button switches operable through apertures in the housing.

20 Claims, 5 Drawing Sheets

BENDING BEAM TORQUE WRENCH

BACKGROUND OF THE INVENTION

The present invention relates to torque-measuring and torque-indicating wrenches and has particular application to such wrenches of the bending-beam type.

Bending beam torque wrenches typically include a resilient beam and a rigid reference beam fixedly secured together at a work-engaging end of the tool. When torque is applied to a workpiece by application of force at a handle end of the resilient beam, the resilient beam deflects an amount which varies as a function of the torque applied. This deflection results in a relative movement between the resilient beam and the reference beam, the distal end of which is free, this relative movement being visually observable with the use of suitable scale indicia, or being detected by suitable sensors.

Another type of torque wrench disclosed, for example, in copending U.S. application Ser. No. 09/118,873, filed Jul. 20, 1998, utilizes two rigid beams with a spring coupling between the ends thereof remote from the workpiece, the torque being coupled from one beam to the other through the spring mechanism, which also accommodates relative displacement of the beams to indicate the magnitude of the torque.

These prior types of torque wrenches have been relatively costly and/or have required that the beams be relatively large and bulky in order to provide the requisite deflection while, at the same time, accommodating transmission of the desired range of torque.

SUMMARY OF THE INVENTION

It is a general object of the invention to provide an improved torque wrench which avoids the disadvantages of prior wrenches while affording additional structural and operating advantages.

An important feature of the invention is the provision of a bending beam-type torque wrench which is of relatively small size and weight and of relatively simple and economical construction.

In connection with the foregoing feature, another feature of the invention is the provision of a torque wrench of the type set forth, which produces a torque measurement substantially unaffected by a user's hand-hold position on the wrench.

Certain ones of these and other features of the invention may be attained by providing a torque wrench comprising: a resilient beam having a work-engaging end and a handle end, a reference beam having first and second ends coupled to the resilient beam respectively adjacent to the work-engaging and handle ends, and measurement apparatus disposed between the first and second ends and responsive to deflection of the resilient beam relative to the reference beam for providing an indication of the amount of torque causing the deflection.

Other features of the invention may be attained by providing a torque wrench of the character described, which includes a handle housing enclosing the beams along substantially their entire lengths and fixed to the resilient beam only adjacent to the handle end.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
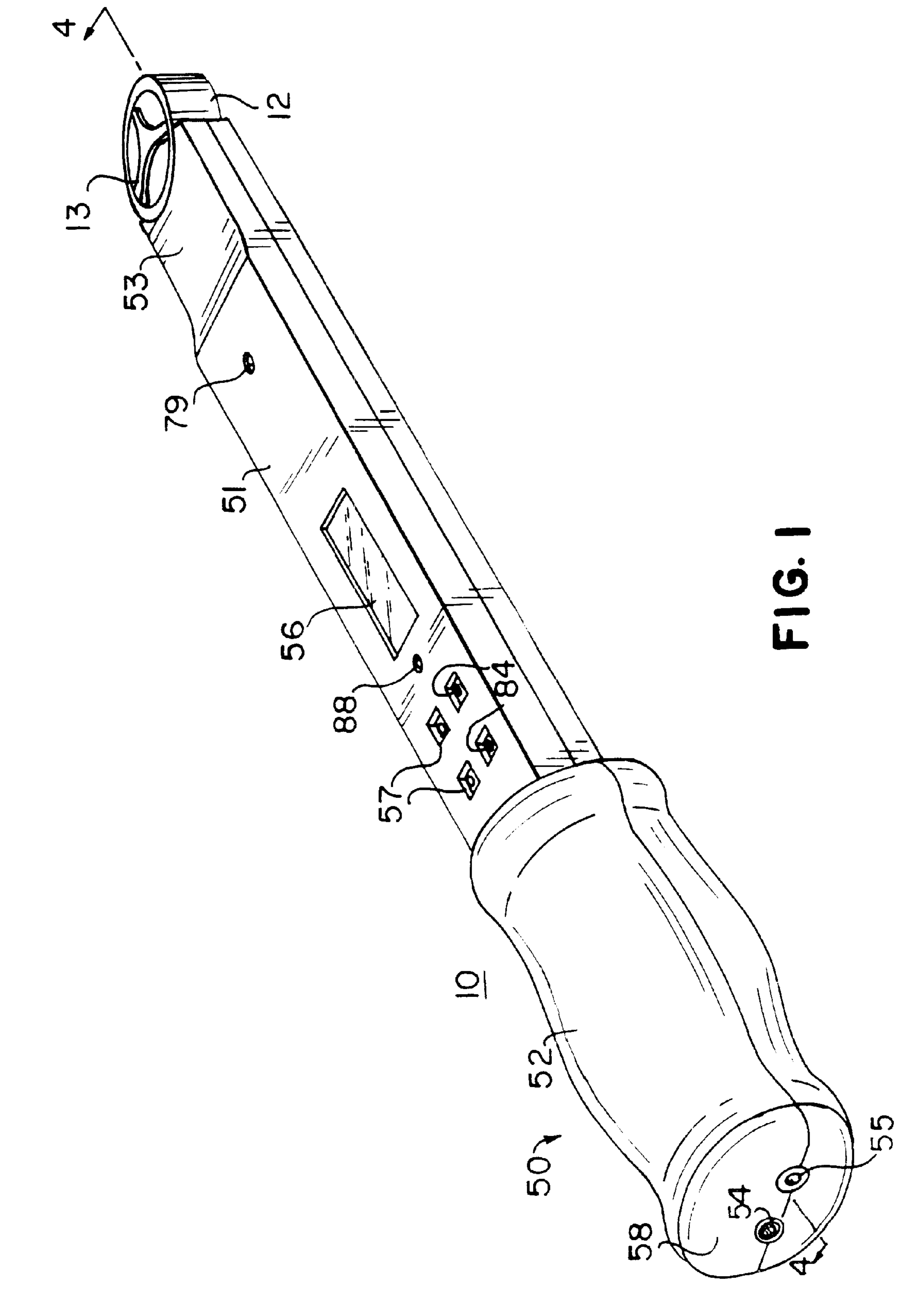
FIG. 1 is a perspective view of the torque wrench in accordance with the present invention.
Figure 2:
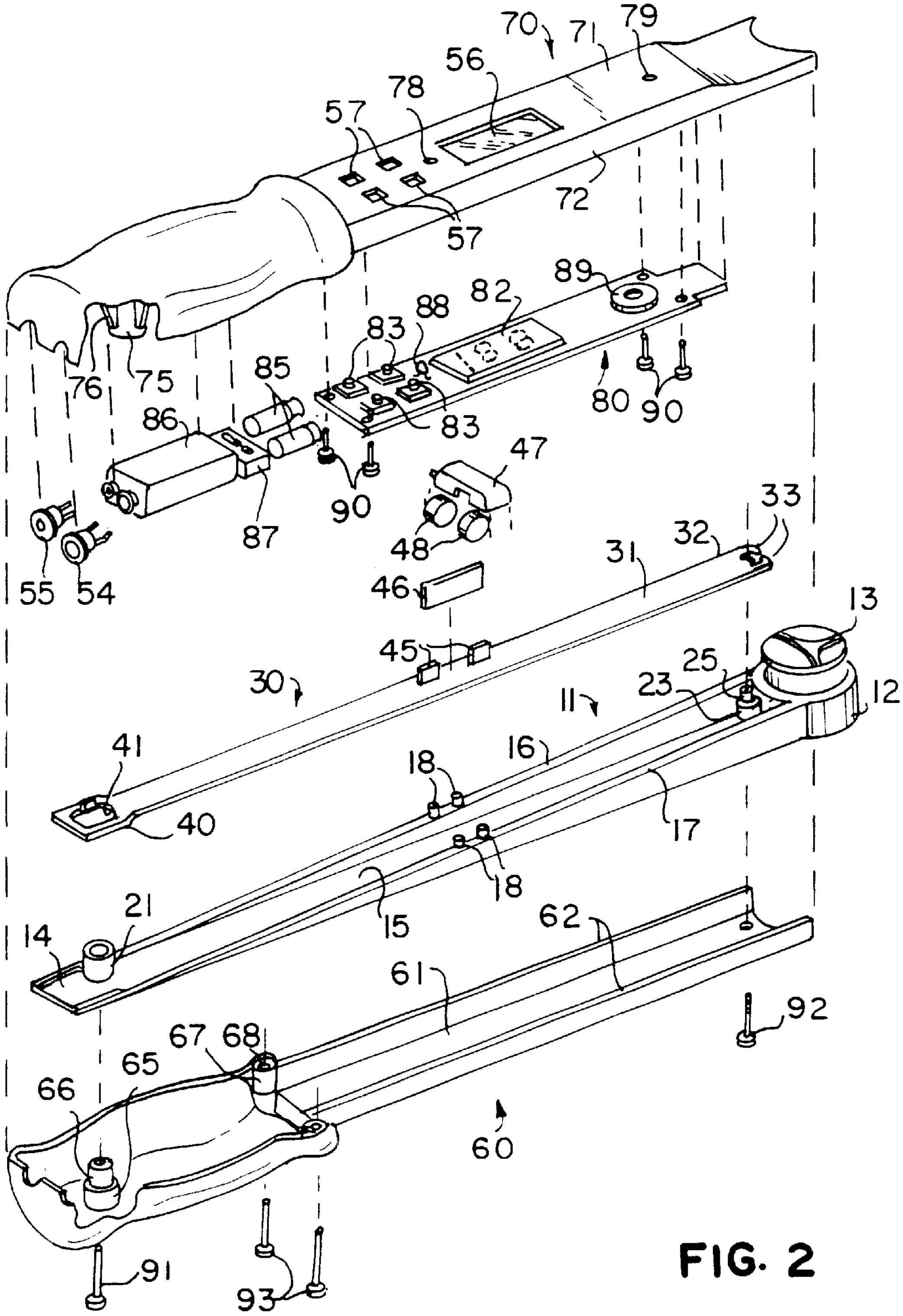
FIG. 2 is a reduced, exploded, perspective view of the torque wrench of FIG. 1 with portions broken away.

Referring to FIGS. 1 and 2, there is illustrated a bending beam-type torque wrench, generally designated by the numeral 10, in accordance with the present invention. The wrench 10 includes an elongated resilient beam 11 having an enlarged, generally circular head or work-engaging end 12 which carries a ratchet assembly 13 of known construction, and a handle end 14. The resilient beam 11 is generally channel-shaped in transverse cross section, having a rectangular base wall 15 unitary at its opposite side edges with upstanding side walls 16 and 17. The resilient beam 11 is tapered in thickness from the head end 12 to the handle end 14. More specifically, the base wall 15 tapers from a relatively thick portion adjacent to the head end 12 to a relatively thin portion adjacent to the handle end 14 (see FIG. 4), while each of the side walls 16 and 17 has a height which tapers from a maximum height at the head end 12 to a negligible height at the handle end 14. Upstanding from each of the side walls 16 and 17, substantially midway along its length, is a pair of axially spaced posts 18, for a purpose to be explained more fully below.

Formed through the base wall 15 adjacent to the handle end 14 is a circular aperture 20 surrounded by a cylindrical hub 21, which projects upwardly from the upper surface of the base wall 15. Formed through the base wall 15 adjacent to the head end 12 is a circular aperture 22 surrounded by an upstanding cylindrical hub 23 which projects upwardly from the upper surface of the base wall 15. Fixedly secured in the hub 23 is a cylindrical sleeve 25, the lower end of which is spaced from the bottom surface of the base wall 15 and the upper end of which projects upwardly above the hub 23 and slightly above the upper edges of the side walls 16 and 17. Preferably, the resilient beam 11 is formed of a suitable moldable plastic material, while the cylindrical sleeve 25 may be formed of metal and may be secured in the hub 23 with a suitable bonding material.

The torque wrench 10 also includes an elongated reference beam 30, preferably formed of a suitable plastic material and of unitary, one-piece molded construction. The reference beam 20 has an elongated, flat, substantially rectangular body 31 dimensioned to fit in the channel defined by the resilient beam 11 and having a width substantially less than the distance between the side walls 16 and 17 of the resilient beam 11. The body 31 is provided at one end with a clevis 32, including a pair of forwardly projecting legs 33 terminating at their distal ends with laterally inturned, generally triangular feet 34 having arcuate inner surfaces 35. Projecting forwardly from the body 31 between the clevis legs 33 is a short rectangular bearing tab 36, provided at its distal end with a thin, upwardly curved lip 37. The lip 37 cooperates with the legs 33 and the feet 34 to define an opening 38 through the body 31. The body 31 is provided with an enlarged rectangular handle end 40 having an oblong aperture 41 formed therethrough. Projecting into the aperture 41 from one side thereof is a short, rectangular side tab 42 provided at its distal end with a thin, upwardly curved lip 43.

The aperture 41 has a front-to-back dimension substantially greater than the outer diameter of the hub 21 of the resilient beam 11, and a dimension from the lip 43 to the opposite side of the aperture 31 substantially the same as or very slightly larger than the outer diameter of the hub 21. Thus, in assembly, the hub 21 is fitted through the aperture 41, while the hub 23 is fitted through the opening 38 in the reference beam 30, the length of the aperture 41 facilitating this assembly. The width of the aperture 41 substantially inhibits lateral movement of the reference beam 30 relative to the resilient beam 11, while accommodating relative pivotal movement thereof about the axis of the hub 21. Similarly, the opening 38 is so dimensioned that the arcuate inner surfaces 35 of the feet 34 define a common circle which, in use, is substantially coaxial with the hub 23 and has a diameter substantially the same as or very slightly greater than that of the hub 23. Thus, once assembled, in the configuration illustrated in FIGS. 4–6, the legs 33 and the feet 34 cooperate with one another and with the lip 37, substantially to inhibit lateral and axial movement of the reference beam 30 relative to the resilient beam 11, while accommodating relative pivotal movement therebetween about the axis of the hub 23.

Integral with the beam body 31 and projecting upwardly therefrom substantially midway between its ends are two pairs of axially and laterally spaced bracket posts 45, which cooperate to resiliently retain therebetween a thin, rectangular Hall-effect sensor plate 46. A magnet bracket 47, preferably formed of a suitable plastic material, spans the side walls 16 and 17 of the resilient beam 11 above the sensor plate 46, the opposite ends of the bracket 47 being retained between the posts 18. The bracket 47 carries a pair of laterally spaced permanent magnets 48. The parts are arranged so that, in the at-rest condition illustrated in FIG. 5, the sensor plate 46 is disposed substantially midway between the magnets 48.

The torque wrench 10 also includes a rigid handle housing, generally designated by the numeral 50, which is of two-part construction, including a base 60 and a cover 70, secured together by suitable fasteners so as to substantially completely enclose the resilient beam 11 and the reference beam 30, except for the work-engaging end 12. The handle housing 50 has an elongated main body 51 rectangular in transverse cross section and provided at one end with an enlarged handle grip 52 and being open at the opposite head end 53. The handle grip 52 defines an end wall 58, in which is disposed a recharge jack 54 and an RS232 port 55. Formed in the top wall of the main body 51 is a rectangular window opening 56 closed by a transparent window **56*a* formed of suitable glass or plastic. Also formed through the top wall of the main body 51 are four rectangular, countersunk apertures 57**, for a purpose to be explained more fully below.

Figure 4:
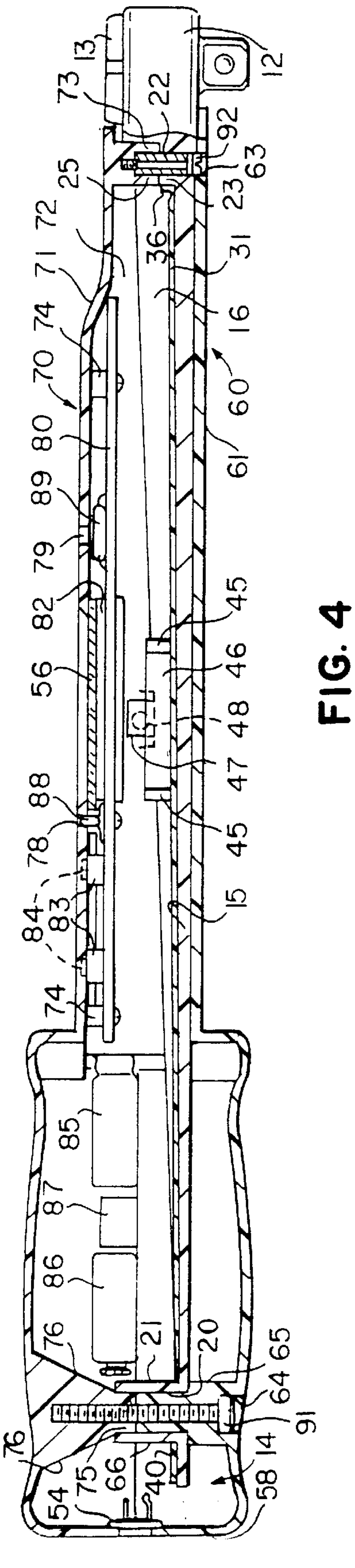
FIG. 4 is an enlarged view in vertical section taken generally along the line 4—4 in FIG. 1.
Figure 5:
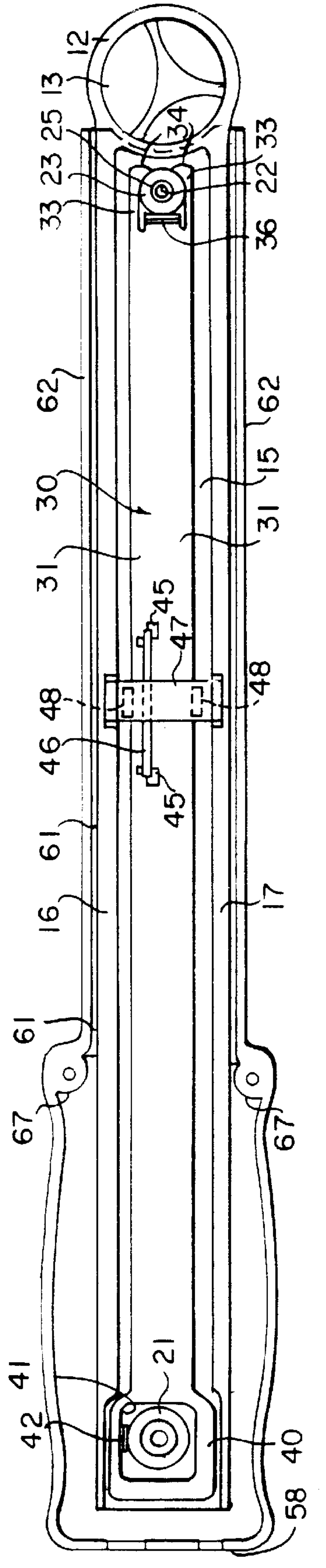
FIG. 5 is a top plan view of the wrench of FIG. 1 with the cover portion of the handle housing removed and in an at-rest condition.
Figure 6:
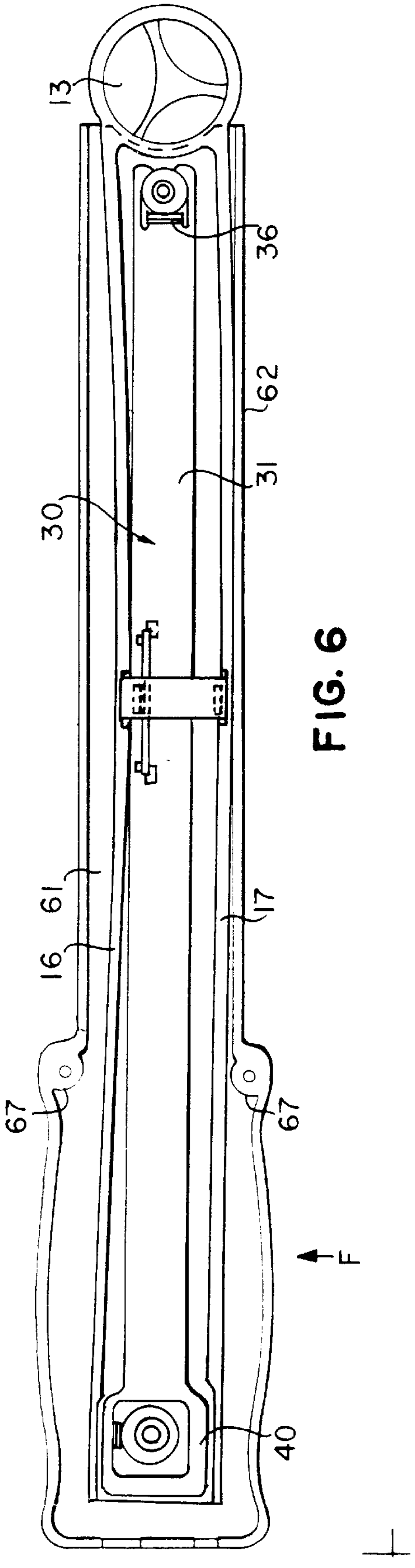
FIG. 6 is a view similar to FIG. 5, illustrating the wrench in a torque-applying condition.
Figure 8:
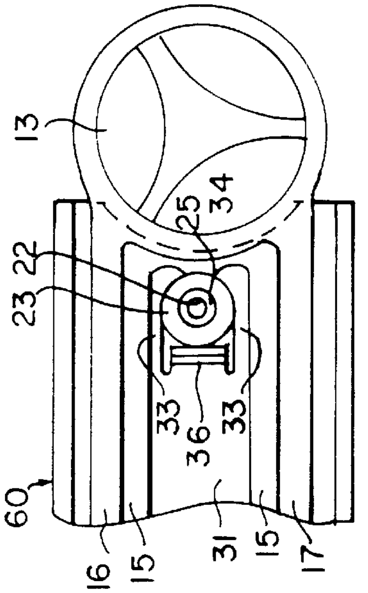
FIG. 8 is an enlarged, fragmentary, top plan view of the front end portion of FIG. 5.
Figure 7:
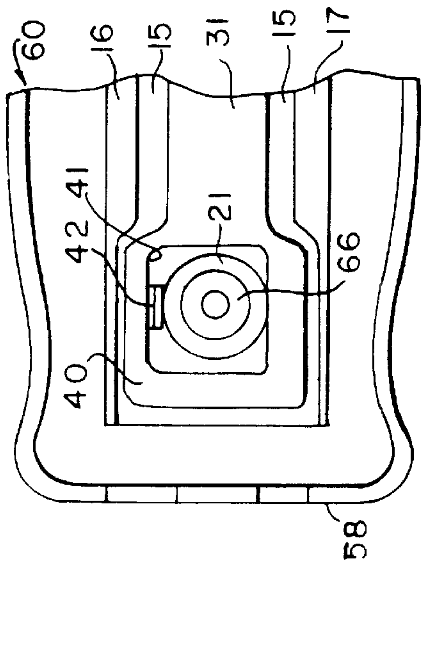
FIG. 7 is an enlarged, fragmentary, top plan view of the rear end portion of FIG. 5.

Referring to FIGS. 2, 4 and 6, the base 60 is generally channel-shaped, having a rectangular bottom wall 61 and upstanding side walls 62. Formed through the bottom wall 61 adjacent to the forward or head end is a small circular hole 63 (FIG. 4). Formed through the bottom wall 61 in the handle grip 52, adjacent to the end wall 58 is a circular hole 64 which is encircled with a cylindrical hub 65, unitary with and projecting upwardly from the inner surface of the bottom wall 61. The hub 65 has a reduced outer diameter tip portion 66. Projecting laterally inwardly from the side walls 62 at the junction between the main body 51 and the handle grip 52 are cylindrical screw embossments 67 which have screw holes 68 therethrough.

Figure 3:
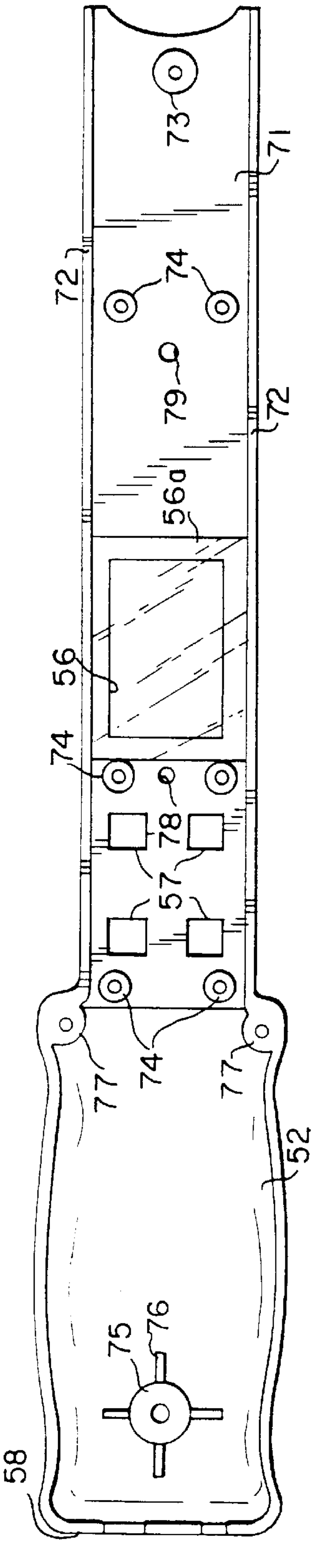
FIG. 3 is an enlarged bottom plan view of the upper handle housing of the wrench of FIG. 2.

Referring to FIGS. 2–4, the cover 70 is similar in shape to the base 60, having a substantially rectangular top wall 71 and depending side walls 72. Depending from the top wall 71 adjacent to the front or head end of the cover 70 is a cylindrical hub 73, dimensioned to receive therein the upper end of the cylindrical sleeve 25 of the resilient beam 11. Also depending from the top wall 71 at axially spaced locations adjacent to the side walls 72 are a plurality of screw lugs 74 for a purpose to be described below. Depending from the top wall 71 adjacent to the handle grip end wall 58 is a cylindrical hub 75 provided with equiangularly spaced, generally triangular reinforcing webs or gussets 76. Integral with the side walls 72 at the junction between the main body 51 and the handle grip 52 are cylindrical screw embossments 77, which may be internally threaded. It will be appreciated that the window aperture 56 and the rectangular apertures 57 are formed in the top wall 71 of the cover 70. Also formed through the top wall 71 are two small circular holes 78 and 79, for a purpose to be explained below.

Figure 9:
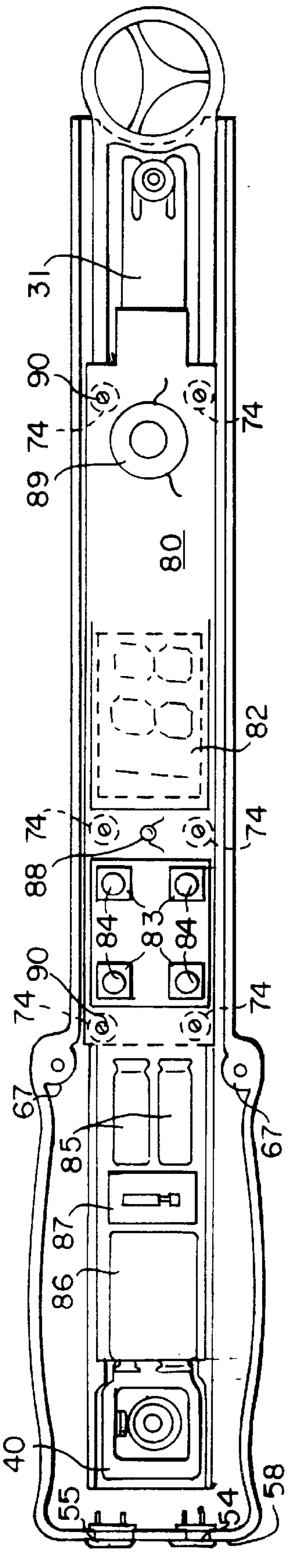
FIG. 9 is a view similar to FIG. 5, but including the PC board and other electronic components.

The torque wrench 10 also includes a rectangular printed ("PC") circuit board 80 (FIGS. 2, 4 and 9), on which are mounted a processor chip 81, an LCD display 82, four rectangular push-button keys 83 with cylindrical touch pads 84, and other associated circuitry (not shown). The PC board 80 is mounted on the cover 70, being screwed to the lugs 74 by screws 90, with the LCD display 82 disposed immediately beneath the window **56*a* and the keys 83 being respectively aligned with the rectangular apertures 57, so that the touch pads 84 respectively project up into the countersinks of the apertures 57, but do not project above the top wall 71 of the cover 70 (see FIG. 4). The circuitry of the torque wrench 10 is powered by a pair of batteries 85, preferably 1.5 volt batteries, such as "AAA"-size batteries. The wrench 10 also includes an 9-volt battery 86 for powering a vibrator motor 87, the batteries 85 and 86 being secured by suitable brackets (not shown) to the cover 70 and/or the base 60. The batteries may be of a rechargeable type, in which case they are suitably connected to the recharge jack 54. It will be appreciated that the batteries 85 and 86 and the vibrator motor 87 are also suitably connected to the processor chip 81 and associated circuitry, which is also suitably connected to the RS232 port 55 by connections not shown. Also mounted on the PC board 80 are an LED 88** and an audible annunciator 89, such as a buzzer or beeper, which are also suitably connected to the processor chip 81. The LED 88 and the annunciator 89 are, respectively, disposed so as, in assembly, to be respectively positioned immediately beneath the cover holes 78 and 79.

In assembly, after the reference beam 30 is mounted in the resilient beam 11 and the magnet bracket 47 is mounted thereon, the beam assembly is seated in the handle housing base 60, with the reduced tip portion 66 of the cylindrical hub 65 received in the cylindrical hub 21 (see FIG. 4), and with the beam aperture 22 coaxially aligned with the base hole 63. Then the cover 70 of the handle housing 50 is positioned over the base 60, with the lower end of the cylindrical hub 75 received in the cylindrical hub 21 of the resilient beam 11 and abutting the upper end of the reduced tip 66 of the base cylindrical hub 65. The cylindrical hub 73 coaxially aligns with the cylindrical hub 23 and receives the upper end of the cylindrical sleeve 25. The screw embossments 77 respectively coaxially abut the screw embossments 67. Then the cover 70 is secured to the base 60 by a screw 91 received through the base hole 64 and threadedly engaged in the cover hub 73, thereby securely to clamp the resilient beam hub 21 between the base hub 65 and the cover hub 73. A screw 92 is received through the base hole 63 and the cylindrical sleeve 25 and threadedly engaged in the cover hub 73. Preferably, the parts are so dimensioned that the cylindrical sleeve 25 bottoms on the cover hub 23 to provide a slight space between the ends of the base and cover hubs 23 and 73, so that when the screw 92 is tightened, the resilient beam hub 21 will not be clamped against the cover hub 73. Thus, while the base 60 is fixed to the cover 70 by the screw 92, the resilient 11 remains free to pivot about the axis of the screw 92. Screws 93 are received through the base screw embossments 67 and threadedly engaged in the cover screw embossments 77, the screw heads preferably being received in recesses in the handle grip 52.

It is a significant aspect of the invention that, when thus assembled, the handle housing 50 is fixedly secured to the resilient beam 11 only at the handle end 14. Thus, torque-applying force will be applied to the resilient beam 11 only at that location, irrespective of the user's hand-hold position along the handle housing 50, thereby effectively preventing the user's hand-hold position from affecting the measurements and readings of the torque-detecting and indicating circuitry.

Another significant aspect of the invention is that the reference beam 30 is coupled to the resilient beam 11 for only relative pivotal movement about the axes of the cylindrical hubs 21 and 23. Accordingly, in use, when the ratchet assembly 13 is coupled to an associated workpiece for applying torque thereto, torquing force applied to the handle housing 50 is transmitted to the resilient beam 11 at the cylindrical hub 21. This torquing force tends to deflect or bend the resilient beam 11 from the at-rest position illustrated in FIG. 5 to a deflected position, as illustrated, for example, in FIG. 6. However, since the reference beam 30 is free to pivot relative to the resilient beam 11 about the axes of the cylindrical hubs 21 and 23, the torquing force is not transmitted to the reference beam 30. Thus, the reference beam 30 does not deflect or bend.

By reason of the bending movement of the resilient beam 11 relative to the reference beam 30, one or the other of the magnets 48 is moved closer to the sensor plate 46, as illustrated in FIG. 6, depending upon the direction of rotation. This change in distance between the magnets 48 and the sensor plate 46 is proportional to the torque applied and is sensed by the Hall-effect sensor plate 46, which outputs a suitable signal to the processor chip 81 which, in a known manner, converts the signal to a torque output displayed on the LCD display 82. It will be appreciated that the circuitry can be operated as a direct-reading, torque-indicating wrench or as a torque limit wrench which presents a visible indication on the LCD display 82 and/or by the LED 78, as well as an audible indication by the annunciator 89 and/or a tactile indication by the vibrator motor 87 when a predetermined torque level is reached. It will further be appreciated that the setting of the predetermined torque level and the selection of the mode of operation of the torque wrench 10 is user-selectable by means of the keys 83.

The tapered construction of the resilient beam 11 results in a substantially constant-strength beam which affords sufficient deflection at the midpoint of the beam where the sensor plate 46 is located. This construction permits sufficient deflection of the resilient beam 11 in relatively small-size wrenches. Furthermore, the unique construction and inter-relationship of the resilient beam 11 and the reference beam 30 afford a small, light-weight and economical construction. Thus, it will be appreciated that the channel-shaped construction of the resilient beam 11 makes it easier to mold and permits achievement of the required strength and flexibility while keeping the overall size of the tool relatively small and minimizing material costs. In larger size wrenches it may not be necessary that the resilient beam 11 be of tapered construction.

While the torque wrench 10 is shown with a ratchet assembly 13 at the work-engaging end 11, which may a reversible ratchet assembly, it will be appreciated that other workpiece-engaging arrangements could be utilized.

From the foregoing, it can be seen that there has been provided an improved torque-indicating and torque-measuring wrench which is of relatively small size and inexpensive and light-weight construction, while providing torque measurements which are substantially immune to the user's hand-hold position.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A torque wrench comprising:

a flexible resilient beam having a work-engaging end and a handle end deflectable relative to each other, a reference beam having first and second ends coupled to the resilient beam respectively adjacent to the work-engaging and handle ends wherein the first and the second ends are capable of movent relative to the work-engaging and handle ends respectivly, and measurement apparatus disposed between the first and second ends and responsive to deflection of the resilient beam relative to the reference beam for providing an indication of amount of torque causing deflection.

2. The torque wrench of claim 1, and further comprising a ratchet mechanism coupled to the resilient beam at the work-engaging end thereof.

3. The torque wrench of claim 1, wherein the measurement apparatus includes a Hall-effect sensor on one of the beams and magnets on the other of the beams.

4. The torque wrench of claim 3, wherein the Hall-effect sensor is mounted on the reference beam, the resilient beam carrying two magnets respectively disposed on opposite sides of the Hall-effect sensor.

5. The torque wrench of claim 1, and further comprising a first coupling structure coupling the first end to the resilient beam for pivotal movement about a first axis, and second coupling structure coupling the second end to the resilient beam for pivotal movement about a second axis.

6. The torque wrench of claim 5, wherein the second coupling structure accommodates a limited relative longitudinal movement of the beams to facilitate coupling of the reference beam to the resilient beam.

7. The torque wrench of claim 1, wherein the resilient beam generally channel-shaped defines a channel in transverse cross section.

8. The torque wrench of claim 7, wherein said the resilient beam has a base wall and a pair of upstanding side walls, the side walls having a height and the base wall having a thickness, the height and the thickness being tapered from maximum values adjacent to the work-engaging and to minimum values adjacent to the handle end.

9. The torque wrench of claim 7, wherein the reference beam is disposed in the channel defined by the resilient beam.

10. The torque wrench of claim 1, wherein the measurement apparatus is disposed intermediate the first and second ends.

11. A torque wrench comprising:

a flexible resilient beam having a work-engaging end and a handle end deflectable relative to each other, a reference beam having first and second ends coupled to the resilient beam respectively adjacent to the work-engaging and handle ends wherein the first and second ends are capable of movement relative to the work-engaging and handle ends respectively, a handle housing enclosing the beams along most of their lengths and fixed to the resilient beam only adjacent to the handle end, and measurement apparatus disposed within the handle housing between the first and second ends and responsive to deflection of the resilient beam relative to the reference beam for providing an indication of amount of torque causing the deflection.

12. The torque wrench of claim 11, wherein the housing is relatively rigid.

13. The torque wrench of claim 11, wherein the housing includes upper and lower parts fixedly secured together.

14. The torque wrench of claim 11, wherein the housing is fixed to the resilient beam adjacent to the location at which the handle end is coupled to the second end.

15. The torque wrench of claim 11, wherein the measurement apparatus includes an electronic circuit including a display and manually operable switches.

16. The torque wrench of claim 15, wherein the housing has a window for viewing the display and apertures providing access to the switches.

17. The torque wrench of claim 11, and further comprising a first coupling structure coupling the first end to the resilient beam for pivotal movement about a first axis, and second coupling structure coupling the second end to the resilient beam for pivotal movement about a second axis.

18. The torque wrench of claim 17, wherein each of the first and second coupling structures includes structure inhibiting non-pivotal relative movement of the first and second beams in use.

19. The torque wrench of claim 11, wherein the measurement apparatus includes a Hall-effect sensor on one of the beams and magnets on the other of the beams.

20. The torque wrench of claim 11, wherein the measurement apparatus is disposed intermediate the first and second ends.

* * * * *

UNITED STATES PATENT AND TRADEMARK OFFICE

CERTIFICATE OF CORRECTION

PATENT NO. : 6,463,811 B1
DATED : October 15, 2002
INVENTOR(S) : Gordon A. Putney It is certified that error appears in the above-identified patent and that said Letters Patent is hereby corrected as shown below:

Column 6,
Line 60, delete "respectivly" and insert -- respectively --.

Column 7,
Line 18, delete "channel-shaped".

Signed and Sealed this

Twenty-second Day of April, 2003

JAMES E. ROGAN
*Director of the United States Patent and Trademark Office*